United States Patent
Li et al.

(10) Patent No.: US 6,977,233 B2
(45) Date of Patent: Dec. 20, 2005

(54) SINTERED SILICON NITRIDE

(75) Inventors: Chien-Wei Li, Livingston, NJ (US);
Bjoern Schenk, Phoenix, AZ (US);
James V. Guiheen, Madison, NJ (US)

(73) Assignee: Honeywell International, Inc., Morristown, NJ (US)

( * ) Notice: Subject to any disclaimer, the term of this patent is extended or adjusted under 35 U.S.C. 154(b) by 69 days.

(21) Appl. No.: 10/621,168

(22) Filed: Jul. 15, 2003

(65) Prior Publication Data

US 2005/0014629 A1 Jan. 20, 2005

(51) Int. Cl.$^7$ .................. C04B 35/577; C04B 35/596
(52) U.S. Cl. .................. 501/92; 501/97.2; 501/97.4; 264/683
(58) Field of Search .................. 501/92, 97.2, 97.4; 264/683

(56) References Cited

U.S. PATENT DOCUMENTS

| | | |
|---|---|---|
| 3,833,389 A | 9/1974 | Korneya et al. |
| 4,234,343 A | 11/1980 | Andersson |
| 4,321,310 A | 3/1982 | Ulion et al. |
| 4,332,909 A | 6/1982 | Nishida et al. |
| 4,401,768 A | 8/1983 | Morgan |
| 4,511,402 A | 4/1985 | Miura et al. |
| 4,716,133 A | 12/1987 | Horiuchi et al. |
| 4,870,036 A | 9/1989 | Yeh |
| 5,021,372 A | 6/1991 | Pyzik et al. |
| 5,091,347 A | 2/1992 | Pyzik et al. |
| 5,100,847 A | 3/1992 | Li et al. |
| 5,118,645 A | 6/1992 | Pyzik et al. |
| 5,158,914 A | 10/1992 | Hamazaki et al. |
| 5,160,508 A | 11/1992 | Pyzik et al. |
| 5,219,500 A | 6/1993 | Yoshida et al. |
| 5,219,600 A | 6/1993 | Kosegaki et al. |
| 5,236,786 A | 8/1993 | Newkirk et al. |
| 5,312,788 A | 5/1994 | Li et al. |
| 5,364,608 A | 11/1994 | Edler |
| 5,370,832 A | 12/1994 | Sugimoto et al. |
| 5,380,179 A | 1/1995 | Nishimura et al. |
| 5,494,866 A | 2/1996 | Li |
| 5,523,267 A | * 6/1996 | Tanaka et al. .................. 501/92 |
| 5,637,540 A | 6/1997 | Li et al. |
| 5,691,261 A | * 11/1997 | Takahashi et al. .......... 501/97.2 |
| 5,702,998 A | 12/1997 | Sugimoto et al. |
| 5,759,933 A | 6/1998 | Li et al. |
| 5,804,523 A | 9/1998 | Oda et al. |
| 5,846,460 A | 12/1998 | Matsuura et al. |
| 5,851,678 A | 12/1998 | Hasz et al. |
| 5,871,820 A | 2/1999 | Hasz et al. |
| 5,914,189 A | 6/1999 | Hasz et al. |
| 6,261,643 B1 | 7/2001 | Hasz et al. |

FOREIGN PATENT DOCUMENTS

JP          2000 247748 A    6/2000

OTHER PUBLICATIONS

Giuseppe Pezzotti and Hans–Joachim Kleebe, Effect of Residual Microstresses at Crystalline Multigrain Junctions on the Toughness of Silicon Nitride, Journal of the European Ceramic Society, Elsevier Science Publishers, Barking, Essex, GB, vol. 19, no. 4, Apr. 1999, pp. 451–455.

Meon–Jin Choi, June–Gunn Lee and Young–Wook Kim, High Temperature Strength and Oxidation Behaviour of Hot–Pressed Silicon Nitride–Disilicate Ceramics, Journal of Materials Science, Chapman and Hall Ltd., London, GB, vol. 32, no. 7, Apr. 1997, pp. 1937–1942.

PCT Internatinal Search Report PCT/US2004/022884 Dec. 6, 2004.
PCT Written Opinion Dec. 6, 2004.

* cited by examiner

*Primary Examiner*—Karl Group
(74) *Attorney, Agent, or Firm*—Ingrassia Fisher & Lorenz

(57) ABSTRACT

Sintered silicon nitride products comprising predominantly β-silicon nitride grains in combination with from about 0.1 to 30 mole % silicon carbide, and grain boundary secondary phases of scandium oxide and scandium disilicate. Such products have high fracture toughness, resistance to recession, and resistance to oxidation at temperatures of at least 1500° C. Methods for preparing sintered silicon nitride products are also disclosed.

35 Claims, 1 Drawing Sheet

SINTERED SILICON NITRIDE

BACKGROUND OF THE INVENTION

The present invention generally relates to a sintered silicon nitride product. The present invention also relates to methods for making a sintered silicon nitride product.

Sintered silicon nitride compositions represent a group of ceramics useful as engineering components for high temperature applications, such as in gas turbine engines. Some prior art sintered silicon nitride products have adequate mechanical properties and oxidation resistance at temperatures in the range of 900° C. to 1400° C. However, such prior art products may exhibit major deficiencies in advanced gas turbine applications in which the turbine inlet temperature may exceed 1500° C.

U.S. Pat. No. 4,401,768 to Morgan discloses a sintered silicon nitride prepared from a mixture of silicon nitride, silicon dioxide (silica), and scandium oxide (scandia). The sintered silicon nitride was produced by hot pressing at 1800° C. to provide a product consisting of silicon nitride, silicon oxynitride, and scandium disilicate. Morgan does not disclose properties such as fracture toughness or oxidation resistance at a temperature of 1500° C.

U.S. Pat. No. 5,804,523 to Oda et al., discloses the production of sintered silicon nitride from a mixture of silicon nitride, silica, and an oxide of a Group 3a (Re) element, the Group 3a element at least including lutetium (Lu). The composition of the sintered product may contain intergranular crystalline phases of a $Re_2Si_2O_7$ (disilicate) or a $Re_2SiO_5$ (monosilicate). Oda et al. discloses fracture toughness only in the range of about 4.5 to 6.5 $MPa.m^{0.5}$.

As can be seen, there is a need for a strong and reliable silicon nitride ceramic with improved mechanical stability and a high level of toughness at high temperatures. There is a further need for a sintered silicon nitride product which exhibits resistance to corrosion and oxidation at high temperatures. The present invention provides such materials, and processes of making the same, as will be described in enabling detail hereinbelow.

SUMMARY OF THE INVENTION

In one aspect of the present invention, there is provided a sintered silicon nitride product comprising from about 60 to 95 mole % β-silicon nitride, and from about 1 to 8 mole % scandium oxide.

In another aspect of the present invention, a sintered silicon nitride product comprises not less than 50 mole % β-silicon nitride, about 0.1 to 30 mole % silicon carbide, about 1 to 15 mole % scandium disilicate, and about 1 to 10 mole % scandium oxide.

In a further aspect of the present invention, there is provided a sintered silicon nitride product comprising β-silicon nitride grains, silicon carbide, a grain boundary secondary phase of scandium oxide, and a grain boundary secondary phase of scandium disilicate. The β-silicon nitride grains comprise about 72 to 92 mole %, the silicon carbide comprises about 3 to 18 mole %, the scandium oxide comprises about 3 to 6 mole %, and the scandium disilicate comprises about 1 to 4 mole %.

In still another aspect of the present invention, a sintered silicon nitride product is formed by sintering a starting powder mix, the starting powder mix comprising about 80 to 95 weight % silicon nitride, about 0.25 to 10 weight % silicon carbide, and about 5 to 12 weight % scandium oxide.

In yet another aspect of the present invention, a component formed from a sintered silicon nitride comprises about 60 to 95 mole % β-silicon nitride, about 2.5 to 25 mole % silicon carbide, about 1 to 10 mole % scandium disilicate, and about 1 to 8 mole % scandium oxide.

In another aspect of the present invention, a method for preparing a sintered silicon nitride product comprises providing a starting powder mix, forming a green body from the starting powder mix, and sintering the green body to form the sintered silicon nitride product; wherein the sintered silicon nitride product comprises about 60 to 95 mole % silicon nitride, about 2.5 to 25 mole % silicon carbide, about 1 to 10 mole % scandium disilicate, and about 1 to 8 mole % scandium oxide.

In an additional aspect of the present invention, a method for preparing a sintered silicon nitride product comprises providing a starting powder mix, forming a green body from the starting powder mix, and sintering the green body to form the sintered silicon nitride product. The starting powder mix comprises silicon nitride in the range of from about 80 to 95 weight %, silicon carbide in the range of from about 0.25 to 10 weight %, and scandium oxide in the range of from about 5 to 12 weight %. Sintering of the green body may include a plurality of gas pressure sintering stages, and the sintered silicon nitride product may comprise about 60 to 95 mole % silicon nitride, about 2.5 to 25 mole % silicon carbide, about 1 to 10 mole % scandium disilicate, and about 1 to 8 mole % scandium oxide. The sintered silicon nitride product prepared according to such a method has a fracture toughness in the range of from about 7.7 to 8.5 $MPa.m^{0.5}$.

These and other features, aspects and advantages of the present invention will become better understood with reference to the following drawings, description and claims.

DETAILED DESCRIPTION OF THE INVENTION

Figure 1:
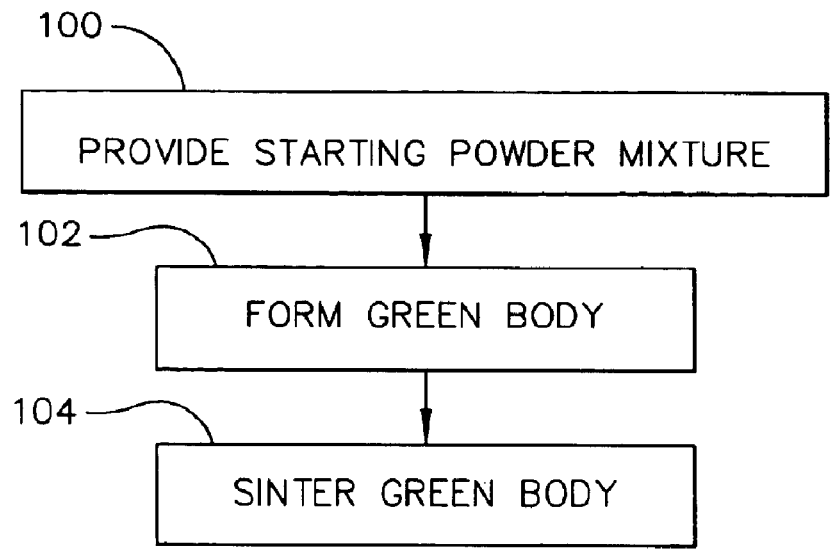
FIG. 1 schematically represents a series of steps involved in a method for preparing a sintered silicon nitride product, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides compositions and methods of making sintered silicon nitride products, which exhibit a combination of desirable properties, including high levels of resistance to oxidation and recession, high strength, and high fracture toughness at high temperatures. As an example, sintered silicon nitride products of the invention are suitable for manufacturing hot section components of gas turbine engines, such as blades, nozzles, and combustion liners, which can experience turbine inlet temperatures up to 1500° C. This invention can also be applied to various other aerospace, automotive, and chemical industry applications where ultra high temperature, anti-corrosion, and load bearing capabilities are required for structural components. Sintered silicon nitride products of the present invention differ from prior art products in having a composition which comprises from about 0.1 to 30 mole % silicon carbide, from about 1 to 10 mole % scandium oxide, and from about 1 to 15 mole % scandium disilicate; and a fracture toughness in the range of from about 7.7 to 8.5 $MPa.m^{0.5}$.

According to one embodiment of the invention, a sintered silicon nitride product may be formed from a starting powder mixture or mix comprising appreciable amounts of silicon carbide (SiC) and scandium oxide ($Sc_2O_3$) in admixture with silicon nitride ($Si_3N_4$) and silicon dioxide ($SiO_2$). A sintered silicon nitride product of the invention may comprise substantial quantities of silicon carbide (SiC), scandium oxide, and scandium disilicate ($Sc_2Si_2O_7$), together with silicon nitride.

As an example, a sintered silicon nitride product of the invention may be formed by gas-pressure sintering a starting powder mix comprising up to about 15 weight % of silicon carbide, wherein the starting powder mix further comprises silicon nitride, scandium oxide (scandia), and silicon dioxide (silica). Typically, silicon carbide is present in the starting powder mix in the range of from about 0.25 to 10 weight %, usually in the range of from about 0.5 to 8 weight %, and often in the range of from about 2 to 6 weight %. In one embodiment, the starting powder mix comprises from about 8 to 10 weight % of silicon carbide.

Typically, silicon nitride is present in the starting powder mix in an amount of at least about 50 weight %, usually in the range of from about 80 to 95 weight %, and often in the range of from about 85 to 92 weight %. The starting powder mix for forming sintered silicon nitride products of the invention may include added silicon dioxide powder in an amount of from about 0 (zero) to 5 weight %, usually in the range of from about 0 (zero) to 3 weight %, and often in the range of from about 1 to 3 weight %. Herein, note that where 0 (zero) weight % of silicon dioxide is stipulated for the starting powder mix, this denotes that silicon dioxide itself is not added to the starting powder mix, it being understood that at least trace quantities of silicon dioxide are anticipated to be present (as a contaminant) in the silicon nitride component of the starting powder mix.

The starting powder mix for forming sintered silicon nitride products of the invention typically comprises scandium oxide in an amount of from about 5 to 12 weight %, usually in the range of from about 6 to 10 weight %, and often in the range of from about 6 to 8 weight %. The relative amounts of scandium oxide and silica in the starting mix may be selected to provide a silicon dioxide:scandium oxide (silica/scandia) molar ratio <2. The silicon dioxide:scandium oxide ($SiO_2/Sc_2O_3$) molar ratio in the starting mix may be in the range of from about 0.3 to 1.99, typically from about 0.4 to 1.5, and often from about 0.4 to 1. These molar ratios include silicon dioxide present in the silicon nitride component of the starting material in an estimated amount equivalent to 1.2 weight % of oxygen as silicon dioxide in the silicon nitride component. For example, based on the 1.2 weight % oxygen (as silicon dioxide) in the silicon nitride component of the starting material, a starting powder mix comprising 8 weight % scandium oxide and about 90 weight % silicon nitride, and having no added silicon dioxide powder component, will have a silica/scandia molar ratio of about 0.6.

Figure 2:
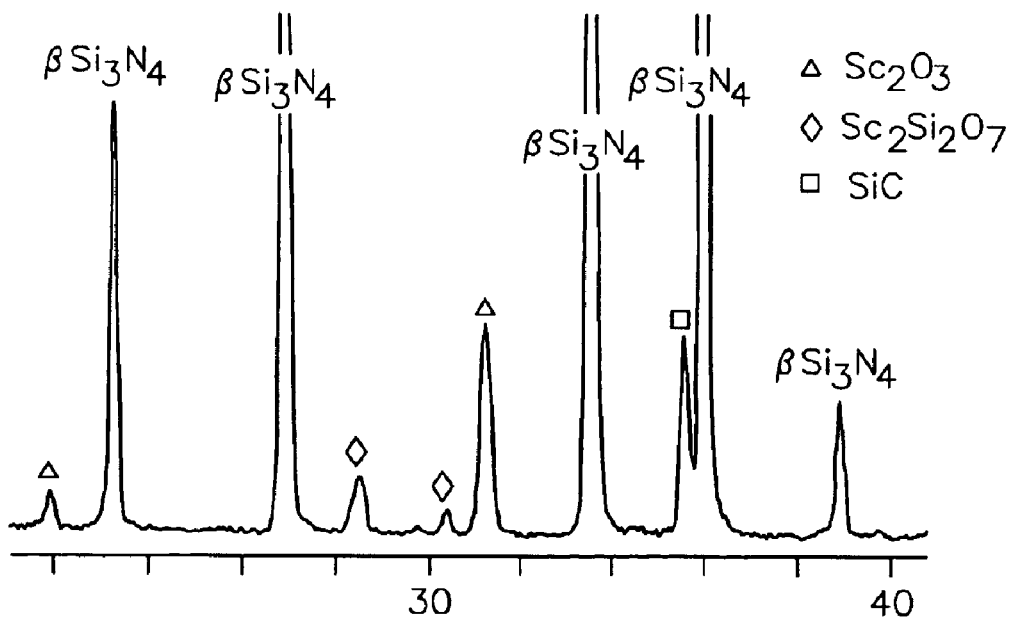
FIG. 2 shows an X-ray diffraction pattern of a sintered silicon nitride product prepared according to the invention.

In sintered silicon nitride products formed from starting mixtures having a $SiO_2/Sc_2O_3$ molar ratio equal to or less than 1 (e.g., samples 2 to 7, Table 1), the predominant grain boundary phase of $Sc_2O_3$ may account for more than 50% of the grain boundary phases (FIG. 2). This is contrast to silicon nitride products of the prior art that have $Sc_2Si_2O7$, $Si_2N_2O$, or $Sc_2SiO_5$ as the primary grain boundary phase.

A sintered silicon nitride product of the invention may comprise β-silicon nitride grains together with particulate silicon carbide, and grain boundary secondary phases of scandium disilicate and scandium oxide. The sintered silicon nitride product may typically comprise at least 50 mole % β-silicon nitride, usually in the range of from about 60 to 95 mole % β-silicon nitride, and often in the range of from about 72 to 92 mole % β-silicon nitride. From about 0 (zero) % to trace quantities of α-silicon nitride may also be present in some embodiments.

Typically, silicon carbide can be present in the sintered silicon nitride product in an amount in the range of from about 0.1 to 30 mole %, usually in the range of from about 2.5 to 25 mole % silicon carbide, and often in the range of from about 3 to 18 mole % silicon carbide. The sintered silicon nitride product typically comprises at least about 1 to 10 mole % scandium oxide, usually in the range of from about 1–8 mole % scandium oxide, and often in the range of from about 3 to 6 mole % scandium oxide. Typically, scandium disilicate may be present in the sintered silicon nitride product in an amount in the range of from about 1 to 15 mole %, usually in the range of from about 1 to 10 mole % scandium disilicate, and often in the range of from about 1 to 4 mole % scandium disilicate.

FIG. 1 schematically represents a series of steps involved in a method for preparing a sintered silicon nitride product, according to one aspect of the invention, wherein step 100 may involve providing a starting powder mixture.

Typically, step 100 may involve combining silicon nitride, silicon carbide, and scandium oxide. Silicon nitride may be typically included in the starting mixture in an amount of at least about 50 weight %, usually in the range of from about 80 to 95 weight %, and often in the range of from about 85 to 92 weight %. Silicon carbide may be typically included in the starting mixture in an amount of up to about 15 weight %, frequently in the range of from about 0.25 to 10 weight %, usually in the range of from about 0.5 to 10 weight %, and often in the range of from about 5 to 10 weight %. Scandium oxide may be typically included in the starting mixture in an amount of from about 5 to 12 weight %, usually in the range of from about 6 to 10 weight %, and often in the range of from about 6 to 8 weight %. In some embodiments, in the range of from about 0 to 5 weight % silica (e.g., as silicon dioxide powder) may also be added to the starting mixture.

Step 102 may involve forming a green body from the starting powder mixture. The green body may be formed by various forming methods for ceramics. For example, the green body may be formed by isostatic dry pressing or by slip casting. For the preparation of green bodies by isostatic dry pressing, the starting powder mixture may be mixed in a suitable solvent, such as isopropanol, and milled with milling media. Such milling may be continued for a period ranging from a few hours to about 1 day (24 hours) or more, and typically for a period of from about 4 to 24 hours.

Thereafter, the milled powder may be dried, and then sieved through screens (e.g., at 100 mesh). Such treatment can typically provide a flow-able starting powder mixture which will flow into a dry-press mold. A mold of suitable size and configuration may then be filled with the flow-able powder. The filled mold may be sealed, and subjected to an isostatic pressure (e.g., at about 25,000 psi) to form a compacted green body.

For the preparation of slip cast green bodies, the starting powder mixture may be mixed with de-ionized water to about 41 to 44 vol. %, and the pH adjusted to a pH of about 9.5 to 10. Thereafter, the mixture may be milled with silicon nitride mill media, for a period similar to that described hereinabove for isostatic dry pressing, to provide a milled mixture. The milled mixture may be poured into plaster molds until enough water is removed to make the material semi-rigid. The semi-rigid body may then be placed in a drying oven until the remaining water is removed to form the green body.

Step 104 can involve sintering the green body to provide a sintered silicon nitride product. Typically, the green bodies can be sintered to more than 99% of the theoretical density at final temperatures in excess of 1900° C. The dried green bodies may be sintered using a carbon furnace in a pressure vessel. Step 104 may typically involve a multi-stage sintering process. In some embodiments, a four-stage sintering process can be employed to achieve the desirable grain boundary phase compositions and microstructures which provide superior high fracture toughness (e.g., from about 7.7 to about 8.5 MPa.m$^{0.5}$, Table 3) and high temperature properties (e.g., oxidation resistance at 1500° C., Table 3) to the sintered silicon nitride. The multi-stage sintering process may be performed for a combined period in the range of from about 5 to 15 hours, more typically from about 6 to 12 hours, and often from about 7 to 11 hours. Details of multi-stage sintering cycles are presented hereinbelow (Table 2).

The sintering process of step 104 may be conducted under pressure of nitrogen gas or, in some stages, under a mixture of nitrogen and argon, and at elevated temperatures, to suppress the decomposition of silicon nitrides. Exemplary sintering conditions, including pressure and temperature ranges, are shown in Table 2. After the multi-stage sintering process or step, a sintered silicon nitride product of the invention is formed. Such a sintered silicon nitride product may be formed as a component, e.g., a hot section component for a gas turbine engine.

Due to the microstructure and grain boundary phases in the final sintered body, sintered silicon nitride products of this invention exhibit high fracture toughness and excellent high temperature properties to about 1500° C. Sintered silicon nitride products of the invention may be characterized, inter alia, by having: a substantial scandium oxide content, typically in the range of from about 1 to 10 mole %; and a fracture toughness typically in the range of from about 7.7 to 8.5 MPa.m$^{0.5}$. (In contrast, as referred to hereinabove, Oda et al. (U.S. Pat. No. 5,804,523) discloses fracture toughness only in the range of about 4.5 to 6.5 MPa.m$^{0.5}$.) Fracture toughness was measured using the indentation-strength method at 20-kg indentation load. Sintered silicon nitride products of the invention may be further characterized by having a sintered density typically in the range of from about 3.15 to 3.25 g/cm$^{-3}$, usually at least about 3.17 g.cm$^{-3}$; and a 20-kg indentation fracture strength typically in the range of from about 330 to 370 MPa, and usually about 350 MPa. Sintered silicon nitride products of the invention may be still further characterized by having a high oxidation resistance at temperatures up to at least about 1500° C. (Table 3), and resistance to recession. While not being bound by theory, Applicant believes that resistance to recession of products of the invention is due, at least in part, to the presence of a $Sc_2O_3$ grain boundary phase, which has no silica activity. The lack of silica activity exhibited by $Sc_2O_3$ improves the high temperature environmental resistance of sintered silicon nitride products of the invention, compared with prior art products which lack a $Sc_2O_3$ grain boundary phase, as is explained fully hereinbelow.

FIG. 2 shows an X-ray diffraction pattern of a sintered silicon nitride product prepared according to one embodiment of the invention. The X-ray diffraction pattern shows the predominance of β-silicon nitride, together with distinct peaks attributable to scandium oxide, scandium disilicate, and silicon carbide.

A number of sintered silicon nitride products of the invention were prepared, according to the starting mixtures listed in Table 1, as described in the below Examples. The properties of such sintered silicon nitride products are presented in Table 3.

TABLE 1

Composition of Starting Powder Mixtures for Preparation of Various Silicon Nitride Sintered Products

| Component added to mix | Sample 1 | Sample 2 | Sample 3 | Sample 4 | Sample 5 | Sample 6 | Sample 7 | Sample* 8 |
|---|---|---|---|---|---|---|---|---|
| $Si_3N_4$ | 90.4 | 91.4 | 90.4 | 87 | 86 | 88 | 83 | 83 |
| $Sc_2O_3$ | 6 | 8 | 7.7 | 8 | 7.7 | 7.7 | 12 | 6 |
| $SiO_2$ | 3 | 0 | 1.3 | 0 | 1.3 | 1.3 | 0 | 6 |
| SiC | 0.6 | 0.6 | 0.6 | 5 | 5 | 3 | 5 | 5 |
| Mass Total | 100 | 100 | 100 | 100 | 100 | 100 | 100 | 100 |
| $SiO_2/Sc_2O_3$ molar ratio[1] | 1.95 | 0.59 | 0.99 | 0.56 | 0.97 | 0.97 | 0.36 | 2.98 |

*outside the scope of this invention;
[1]includes 1.2 wt. % oxygen conversion to $SiO_2$ in the $Si_3N_4$ starting component.

EXAMPLES

Example 1

Samples of sintered silicon nitride products of the invention were prepared from starting materials, having the compositions of samples 1 to 7 shown in Table 1, by mixing powders of the various components to provide a starting powder mix; forming a green body from the starting powder mix; and then sintering the green bodies to >99% of their theoretical density at final temperatures of >1900° C. Sample 8 in Table 1 has composition that is outside the scope of this invention. The ceramic powders were mixed in either water or alcohol, and ball-milled for 4 to 24 hours. The silicon nitride powder was commercially available UBE E-10 powder (Ube America, Inc., New York, N.Y.), which is predominantly α-Si3N4 having a surface area of approximately 10 m$^2$.g$^{-1}$, a low level of cationic impurities, an oxygen impurity level of approximately 1.2 weight %, and an average particle size of approximately 0.5μ. The scandium oxide, silicon oxide, and silicon carbide were commercially available powders of at least 99 weight % purity and had an average grain size of 1.0μ or less. The green bodies were prepared either by cold isostatic pressing (Example 2) or by slip casting (Example 3).

Example 2

Preparation of Dry-Pressed Green Bodies by Cold Isostatic Pressing.

1 kg of starting powder mixture was mixed with 2 liters of isopropyl alcohol and milled with 4 kg of milling media for 24 hours. The milled powder was dried and sieved through 100 mesh screens to provide a flow-able powder. Rubber molds of approximately 2.5 cm×2.5 cm×15 cm were filled with the flow-able powder, sealed, and subjected to an isostatic pressure of 25,000 psi. The compacted green bodies were about 2 cm×2 cm×10 cm.

Example 3
Preparation of Green Bodies by Slip Casting 1 kg of starting powder mixture was mixed with 41 to 44 vol. % de-ionized water, and the pH adjusted to pH 9.5 to 10 using $NH_4OH$. The mixture was milled with 4 kg of silicon nitride mill media for 24 hours. The milled mixture was de-aired and screened, and 200 gram aliquots were poured into plaster molds until enough water was removed to make the aliquoted material semi-rigid. The semi-rigid body was then placed in a drying oven until the remaining water was removed from the green body.

Example 4
Preparation of Sintered Silicon Nitride Products from Green Bodies

The dried green bodies were sintered by gas pressure sintering, using a carbon furnace in a pressure vessel, under nitrogen gas to suppress the decomposition of silicon nitrides. Three alternative sintering cycles were used to manufacture the examples of this invention, each sintering cycle comprising four stages, as shown in Table 2. Taking sintering cycle 1 as an example, stage 1 employed a temperature of 1625–1700° C. for four hours at a nitrogen pressure of 10–50 psi; stage 2 employed a temperature of 1925–1975° C. for four hours at a nitrogen pressure of 100–200 psi; stage 3 employed a temperature of 2025° C. for 1.5 hours at a nitrogen pressure of 350 psi. Thereafter, stage 4 employed a temperature of 2025° C. for 1.5 hours at an initial nitrogen pressure of 350 psi, with the pressure being increased during stage 4 to a total or final pressure in the range of about 900 psi (350 psi $N_2$+550 psi argon) to 1500 psi (350 psi $N_2$+1150 psi argon) by the addition of from 550 to 1150 psi of argon. A four-stage sintering process was employed to manufacture the product of this invention to achieve the desirable grain boundary phase compositions and microstructure for superior high fracture toughness and high temperature properties. The sintered body was crystallized at 1500° C. under nitrogen to provide a sintered silicon nitride product in which the final grain boundary phases were mainly $Sc_2O$ and $Sc_2Si_2O_7$ (see, e.g., FIG. 2). For samples 2 to 6, the starting mixture of which had a $SiO_2$/$Sc_2O_3$ molar ratio equal to or less than 1, the predominant grain boundary phase of $Sc_2O_3$ accounted for more than 50% of the grain boundary phases.

Table 3 shows the properties of sintered silicon nitride products prepared from the starting mixtures listed in Table 1. The data in Table 3 is for the average result of replicate tests for fracture toughness, oxidation weight gain, and sintered density. The oxidation weight gain data is a measure of the oxidation resistance of the various sintered silicon nitride products at temperatures of up to 1500° C. Sintered silicon nitride products of the invention typically exhibit an oxidation weight gain at a temperature of 1500° C. in the range of from about 0.27 to 0.45 mg.$cm^{-2}$, and usually from about 0.27 to 0.38 mg.$cm^{-2}$.

The fracture toughness reported herein (Table 3) was measured by one particular method, namely the indentation strength method at a 20 kg indentation load. It is well known in the art that other fracture toughness measurement methods and calculations tend to yield higher fracture toughness values for ceramic materials. The indentation strength method applied here is a more reliable and accurate measurement method to evaluate the fracture toughness property of a given material.

The fracture toughness of 8.1 MPa.$m^{0.5}$ for those sintered products shown in Table 3 corresponds to a 20-kg indentation fracture strength of 350 MPa for bend bars of the sintered products with 20 kg Vickers indentations on the tensile surface as the fracture origin. This high retained-strength of indented bars reveals strong damage resistance, hence the true high fracture toughness property of the products of this invention.

TABLE 3

Properties of Sintered Silicon Nitride Products

| Sample | Fracture Toughness (MPa · $m^{0.5}$) | Oxidation wt. Gain, 1000° C./ 100 h (mg · $cm^{-2}$) | Oxidation wt. gain, 1400° C./ 100 h (mg · $cm^{-2}$) | Oxidation wt. gain, 1500° C./ 100 h (mg · $cm^{-2}$) | Sintered density (g · $cm^{-3}$) |
|---|---|---|---|---|---|
| 1 | 7.7 | 0.05 | 0.05 | 0.38 | 3.21 |
| 2 | 8.3 | 0.05 | 0.15 | 0.30 | 3.20 |
| 3 | 8.1 | 0.01 | 0.19 | 0.27 | 3.21 |
| 4 | 8.5 | 0.02 | 0.2 | 0.35 | 3.19 |
| 5 | 8.1 | 0.03 | 0.21 | 0.33 | 3.21 |
| 6 | 8.4 | 0.06 | 0.26 | 0.45 | 3.21 |
| 7 | 8.0 | 0.04 | 0.22 | 0.40 | 3.22 |
| 8* | 2.8 | 0.05 | 0.19 | 0.34 | 3.17 |

*Outside the scope of this invention

The high fracture toughness and strong oxidation resistance of sintered silicon nitride products of the invention are important properties for applications in gas turbine engine hot section components. While not being bound by theory, Applicant believes that the property of high fracture toughness exhibited by sintered silicon nitride products of the invention is a result of the acicular microstructure of the sintered products developed from the four-stage sintering

TABLE 2

Sintering Cycles for Formation of Silicon nitride Products

| Sintering Cycle | Stage 1 | Stage 2 | Stage 3 | Stage 4 |
|---|---|---|---|---|
| 1 | 1625–1700° C., 4 hrs, 10–50 psi $N_2$ | 1925–1975° C., 4 hrs, 100–200 psi $N_2$ | 2025° C., 1.5 hrs, 350 psi $N_2$ | 2025° C., 1.5 hrs, 350 psi $N_2$ + 550–1150 psi Ar |
| 2 | 1825° C., 2 hrs, 100 psi $N_2$ | 1950° C., 3 hrs, 150 psi $N_2$ | 2015° C., 1 hr, 350 psi $N_2$ | 2015° C., 1 hr, 350 psi $N_2$ + 550–1150 psi Ar |
| 3 | 1800° C., 2 hrs, 100 psi $N_2$ | 1925° C., 3 hrs, 125 psi $N_2$ | 2000° C., 1 hr, 350 psi $N_2$ | 2000° C., 1 hr, 350 psi $N_2$ + 550–1150 psi Ar | process (e.g., Table 2), and from the existence of crystalline grain boundary phases, e.g., of $Sc_2O_3$, that have a coefficient of thermal expansion (CTE) much higher (e.g., up to >2×) than that of the β-silicon nitride grain. As a comparison, the $Si_2N_2O$ grain boundary phase (as in prior art products) has a CTE of ~3×10$^{-6°}$ K$^{-1}$ which is almost the same as that of the β-silicon nitride grain. In contrast, the $Sc_2O_3$ grain boundary phase in products of the present invention has a CTE of 8×10$^{-6°}$ K$^{-1}$, which is more than two times (2×) higher than the CTE of silicon nitride. The high residual stresses resulting from the mismatch in thermal expansion between the $Sc_2O_3$ grain boundary phase and the silicon nitride grains, in products of the invention, enhances the debonding of the β-silicon nitride grains, and increases the fracture toughness to >8 MPa.m$^{0.5}$.

Furthermore, products of this invention show strong oxidation resistance at high temperatures. For example, after 100 hour of oxidation at a temperature of 1400 or 1500° C., the weight gain is <0.25 mg.cm$^{-2}$ and <0.5 mg.cm$^{-2}$ respectively (see, e.g., Table 3). Additionally, the surface of the oxidized materials shows very little damage subsequent to the oxidation testing regime.

In addition, $Sc_2O_3$ as the grain boundary phase in the product of this invention has no silica activity, as opposed to the grain boundary phases such as $Si_2N_2O$ or $Sc_2Si_2O_7$ of prior art silicon nitride products, which have relatively high silica activities. The lack of silica activity exhibited by $Sc_2O_3$ improves the high temperature environmental resistance of sintered silicon nitride products of the invention, especially in an environment, such as a gas turbine engine, having a high water vapor pressure concentration. It is well known that the recession of silicon nitride ceramics in high temperature/high water vapor environments is related to the conversion of silica into silicon hydroxide gas species. Therefore, the low silica activity in the grain boundary phase of sintered silicon nitride products of the present invention results in increased resistance to recession, as compared with prior art products which lack a $Sc_2O_3$ grain boundary phase.

It should be understood, of course, that the foregoing relates to preferred embodiments of the invention and that modifications may be made without departing from the spirit and scope of the invention as set forth in the following claims.

We claim:

1. A sintered silicon nitride product, comprising from about 60 to 95 mole % β-silicon nitride, from about 1 to 8 mole % scandium oxide, from about 2.5 to 25 mole % silicon carbide, and from about 1 to 10 mole % scandium disilicate.

2. The sintered silicon nitride product of claim 1, wherein said sintered silicon nitride product comprises from about 72 to 92 mole % β-silicon nitride, from about 3 to 18 mole % silicon carbide, from about 1 to 4 mole % scandium disilicate, and from about 3 to 6 mole % scandium oxide.

3. The sintered silicon nitride product of claim 1, wherein said sintered silicon nitride product has a fracture toughness, as measured by the indentation strength method at a 20 kg indentation load, in the range of from about 7.7 to 8.5 MPa.m$^{0.5}$.

4. The sintered silicon nitride product of claim 1, wherein said sintered silicon nitride product has a 20-kg indentation fracture strength in the range of from about 330 to 370 MPa.

5. The sintered silicon nitride product of claim 1, wherein said sintered silicon nitride product has an oxidation weight gain at a temperature of 1500° C. in the range of from about 0.27 to 0.38 mg.cm$^{-2}$.

6. A sintered silicon nitride product, comprising: not less than 50 mole % β-silicon nitride, from about 0.1 to 30 mole % silicon carbide, from about 1 to 15 mole % scandium disilicate, and from about 1 to 10 mole % scandium oxide.

7. The sintered silicon nitride product of claim 6, comprising from about 72 to 92 mole % β-silicon nitride, from about 3 to 18 mole % silicon carbide, from about 1 to 4 mole % scandium disilicate, and from about 3 to 6 mole % scandium oxide.

8. The sintered silicon nitride product of claim 6, wherein said sintered silicon nitride product has a sintered density of at least about 3.17 g.cm$^{-3}$.

9. A sintered silicon nitride product, comprising:
   β-silicon nitride grains;
   silicon carbide;
   a grain boundary secondary phase of scandium oxide; and
   a grain boundary secondary phase of scandium disilicate, wherein said β-silicon nitride comprises from about 72 to 92 mole %, said silicon carbide comprises from about 3 to 18 mole %, said scandium oxide comprises from about 3 to 6 mole %, and said scandium disilicate comprises from about 1 to 4 mole %.

10. A sintered silicon nitride product prepared by said starting powder mix comprising silicon nitride in the range of from about 80 to 95 weight %, silicon carbide in the range of from about 0.25 to 10 weight %, and scandium oxide in the range of from about 5 to 12 weight %.

11. The sintered silicon nitride product of claim 10, wherein said starting powder mix further comprises up to about 3 weight % added silicon dioxide powder.

12. The sintered silicon nitride product of claim 11, wherein said starting powder mix has a silicon dioxide scandium:oxide molar ratio in the range of from about 0.4 to 1.

13. A component formed from a sintered silicon nitride, said sintered silicon nitride comprising from about 60 to 95 mole % β-silicon nitride, from about 2.5 to 25 mole % silicon carbide, from about 1 to 10 mole % scandium dislicate, and from about 1 to 8 mole % scandium oxide.

14. The component of claim 13, wherein said component is a hot section component of a gas turbine engine.

15. A method of preparing a sintered silicon nitride product, comprising:
   a) providing a starting powder mix;
   b) forming a green body from said starting powder mix; and
   c) sintering said green body to form said sintered silicon nitride product, wherein said sintered silicon nitride product comprises from about 60 to 95 mole % silicon nitride, from about 2.5 to 25 mole % silicon carbide, from about 1 to 10 mole % scandium disilicate, and from about 1 to 8 mole % scandium oxide.

16. The method of claim 15, wherein said step a) comprises providing said starting powder mix comprising silicon nitride in the range of from about 80 to 95 weight %, silicon carbide in the range of from about 0.25 to 10 weight %, and scandium oxide in the range of from about 5 to 12 weight %.

17. The method of claim 15, wherein said starting powder mix further comprises added silicon dioxide powder in the range of from about 1 to 3 weight %.

18. The method of claim 15, wherein said starting powder mix has a silicon dioxide scandium:oxide molar ratio in the range of from about 0.4 to 1.

19. The method of claim 15, wherein said step b) comprises forming said green body by a process selected from the group consisting of isostatic dry pressing and slip casting.

20. The method of claim 15, wherein said step comprises gas pressure sintering at a final pressure in the range of from about 900 to 1500 psi.

21. The method of claim 15, wherein said step comprises gas pressure sintering at a temperature in the range of from about 1625 to 2025°C.

22. The method of claim 15, wherein said step c) comprises a plurality of sintering stages.

23. The method of claim 22, wherein said plurality of sintering stages are performed for a combined period in the range of from about 5 to 15 hours.

24. The method of claim 15, wherein said step c) comprises a first, a second, a third, and a fourth sintering stage.

25. The method of claim 24, wherein said fourth sintering stage comprises sintering under nitrogen at a first sintering pressure, and during said fourth sintering stage introducing argon to provide a second sintering pressure, said second sintering pressure higher than said first sintering pressure.

26. The method of claim 24, wherein said fourth sintering stage comprises sintering at a final pressure in the range of from about 900 to 15 psi and a temperature of at least 2000°C.

27. A method of preparing a sintered silicon nitride product comprising:
   a) providing a starting powder mix, said starting powder mix comprising silicon nitride in the range of from about 80 to 95 weight %, silicon carbide in the range of from about 0.25 to 10 weight %, and scandium oxide in the range of from about 5 to 12 weight %;
   b) forming a green body from said starting powder mix; and
   c) sintering said green body to form said sintered silicon nitride product, wherein said step c) comprises gas pressure sintering and includes a plurality of sintering stages, and wherein said sintered silicon nitride product comprises from about 60 to 95 mole % silicon nitride, from about 2.5 to 25 mole % silicon carbide, from about 1 to 10 mole % scandium disilicate, and from about 1 to 8 mole % scandium oxide, said sintered silicon nitride product having a fracture toughness in the range of from about 7.7 to 8.5 MPa.m$^{0.5}$.

28. The method of claim 27, wherein said sintered silicon nitride product has a 20-kg indentation fracture strength in the range of from about 330 to 370 MPa.

29. The method of claim 28, wherein said starting powder mix provided in aid step a) has a silicon dioxide scandium:oxide molar ratio in the range of from about 0.4 to 1.

30. The sintered silicon nitride product of claim 10, wherein said starting powder mix has a silicon dioxide:scandium oxide molar ratio that is less than 2.0.

31. The sintered silicon nitride product of claim 10, wherein said starting powder mix includes said silicon carbide up to 6 weight %.

32. The sintered silicon nitride product of claim 10, wherein said starting powder mix futher comprises up to about 5 weight % added silicon dioxide powder.

33. The method of claim 15, wherein said starting powder mix has a silicon dioxide:scandium oxide molar ratio that is less than 2.0.

34. The method of claim 15, wherein said starting powder mix includes said silicon carbide up to 6 weight %.

35. The method of claim 15, wherein said starting powder mix further comprises added silicon dioxide powder up to 5 weight %.

* * * * *

UNITED STATES PATENT AND TRADEMARK OFFICE
CERTIFICATE OF CORRECTION

PATENT NO. : 6,977,233 B2 Page 1 of 1
APPLICATION NO. : 10/621168
DATED : December 20, 2005
INVENTOR(S) : Li et al.

It is certified that error appears in the above-identified patent and that said Letters Patent is hereby corrected as shown below:

Column 9, line 47, "10 mole %" should be changed to --10%--;
Column 10, line 30, "silicon dioxide scandium:oxide" should be changed to --silicon dioxide:scandium oxide--;
Column 10, line 59, "silicon dioxide scandium:oxide" should be changed to --silicon dioxide:scandium oxide--;
Column 10, line 65, "step comprises" should be changed to --step c) comprises--;
Column 11, line 1, "step comprises" should be changed to --step c) comprises--;
Column 11, line 18, "15 psi" should be changed to --1500 psi--.

Signed and Sealed this

Twenty-second Day of May, 2007

JON W. DUDAS
*Director of the United States Patent and Trademark Office*